United States Patent Office 3,709,914
Patented Jan. 9, 1973

---

3,709,914
METHYLENEDIOXYPHENYL COMPOUNDS
John B. Siddall, Palo Alto, Calif., assignor to
Zoecon Corporation, Palo Alto, Calif.
No Drawing. Filed July 30, 1970, Ser. No. 59,762
Int. Cl. C07d *13/10*
U.S. Cl. 260—340.5                   27 Claims

---

ABSTRACT OF THE DISCLOSURE

Novel methylenedioxyphenyl compounds of Formulas I, II, III and IV and intermediates useful for control of insects.

---

This invention relates to novel methylenedioxyphenyl compounds, syntheses thereof and methods and compositions for the control of insects.

The methylenedioxyphenyl compounds of the present invention are those of the Formulas I, II, III and IV:

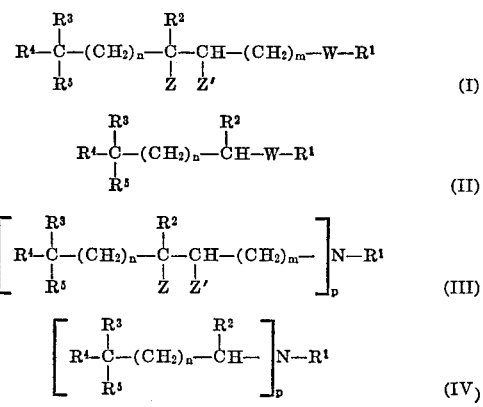

wherein:

$R^1$ is the group

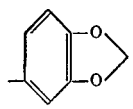

each of $R^2$, $R^3$ and $R^4$ is lower alkyl;
$R^5$ is —OR in which R is hydrogen, lower alkyl or aralkyl;
W is oxygen, sulfur, sulfinyl or sulfonyl;
each of Z and Z' is hydrogen or taken together a carbon-carbon double bond;
$m$ is one or two;
$n$ is three or four; and
$p$ is one or two.

The term "lower alkyl," as used herein, refers to primary or secondary alkyl having a chain length of one to six carbon atoms, straight or branched chain, such as methyl, ethyl, n-propyl, i-propyl, n-butyl, i-butyl, s-butyl, n-pentyl, i-hexyl and n-hexyl. The term "aralkyl," as used herein, refers to aralkyl of seven to twelve carbon atoms, such as benzyl, phenethyl, methylbenzyl and naphthylmethyl.

The compounds of Formulas I, II, III and IV are useful for the control of insects. They are applied using liquid or solid carriers and, preferably, at a time so as to contact the immature insect during the embryo, larvae or pupa stage of the insect's life. The control of insects can be brought about by such treatment as contact of the insect with the compound by direct topical contact, vapor contact, contact through ingestion or transmittal from one insect to another through physical contact. For example, topical application, as by spraying, of a compound of the present invention to an insect during the egg, larvae or pupa stage effectively inhibits the normal passage of the immature insect to the next metamorphic stage. In some cases, complete inhibition is obtained and in other cases partial inhibition occurs resulting in an imperfect insect which is unable to reproduce. The compounds can be used at very low dosage levels of the order of 0.001 μg. to 10 μg. per insect. In the application of the compounds, the application can be such as to apply lower or higher dosages of the aforementioned range based on such factors as the estimated insect population, environmental conditions, locus of the insects and previous trials. Carriers, such as water, mineral and vegetable oils, e.g. refined kerosene, xylene, toluene, cottonseed oil, sesamol, and the like, and solid carriers, such as silica, talc, resins, synthetic polymers, can be used to dilute the active ingredient. Insect attractants or pheromones can also be included. Emulsifying agents and wetting agents can be used in formulations of the compounds to assist in application. Generally, the formulation will contain less than 95% by weight of the active compound and more frequently less than 25%.

Typical insects which can be controlled by treatment with the compounds of the present invention are bugs of the family Miridae, such as Lygus bugs; Diptera, such as *Aedes aegypti;* Aphididae, such as melon aphid and cabbage aphid; *Periplaneta americana, Galleria mellonella, Tenebrio molitor, Tribolium confusum, Oncopeltus fasciatus, Phthorimoea operculella* (potato tubermoth), Dysdercus, *Hypera postica, Manduca sexta* and *Heliothis zea*.

Depending upon the particular insect being treated and the particular stage of the life cycle at the time of treatment, control of insects by treatment with a compound of the present invention is attributed to the compound's activity to: inhibit metamorphosis; act as a direct insecticide, particularly at the embryo stage; act as a chemosterilant; or break the diapause of the insect.

Although not intending to be limited by a theoretical explanation, it appears that the effectiveness of the compounds of the present invention can be traced to their ability to mimic the activity of juvenile hormone substances. Juvenile hormone has been identified as methyl 10,11-(cis)oxido - 7 - ethyl-3,11-dimethyltrideca-2(trans), 6(trans)-dienoate (Roeller et al., Angew. Chem. internat. Edit. 6, 179 (1967) and methyl 10,11(cis)oxido-3,7,11-trimethyltrideca-2(trans), 6(trans)-dienoate (Meyer et al., Proc. N.A.S. (U.S.) 60, 853 (1968). Juvenile hormone analogs have been described in Life Sciences 4, 2323 (1965); Romanuk et al., Proc. N.A.S. (U.S.) 57, 349 (1967); Science 164, 323 (1969); U.S. Pats. 3,429,970 and 3,453,362; Canadian Pat. 834,191 and Wakabayashi, J. Med. Chem. 12, 191 (1969).

In the application of the compounds of the present invention involving isomerism, there is usually employed a mixture of isomers. As individual isomers, the trans isomer (i.e. when Z and Z' form a double bond) is preferably employed for the control of insects.

The compounds of the present invention can be conveniently prepared from the corresponding olefin using mercuric salt followed by reduction of the oxymercurial intermediate in situ. Thus, an olefin of the formula ($n'$ is two or three):

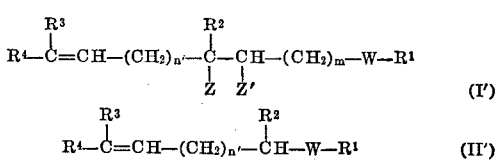

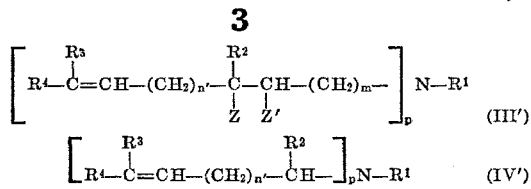

is reacted with, for example, mercuric acetate in aqueous ether followed by reduction to yield the corresponding compound of Formulas I, II, III or IV in which $R^5$ is —OH. By conducting the reaction in the presence of the appropriate alcohol, the corresponding ether is obtained. Suitable mercuric salts include mercuric acetate, mercuric nitrate, mercuric trifluoroacetate, mercuric acylates and mercuric halides. Suitable reducing agents include the borohydrides, hydrazine and sodium amalgam. See Brown and Rei, J. Am. Chem. Soc. 91, 5646 (1969); Brown and Kurek, J. Am. Chem. Soc. 91, 5647 (1969); Lattes and Perie, Tetrahedron Letters, No. 51, 5165 (1967); J. Amer. Chem. Soc. 89, 1522 and 1524 (1967); Perie and Lattes, Bulletin De La Societe Chimique De France, No. 2, 583 (1970) and Lattes and Perie, C.R. Acad. Sci. Paris 262, 1591 (1966) in which there is described suitable methods for conversion of the olefins I′, II′, III′ and IV′ into the compounds of the present invention.

The starting compounds I′ and II′, in which W is oxygen, can be prepared by the reaction of sesamol with a bromide or chloride of the Formula V or VI (X is bromo or chloro):

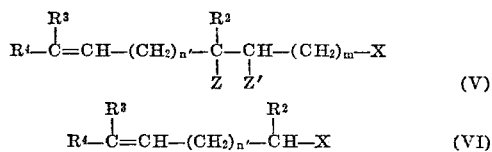

The reaction is usually conducted by alkylation of a salt of sesamol with bromide or chloride (V or VI). See, for example, Bowers, Science 164, 323 (1969) and U.S. Pats. 2,764,517; 2,755,219; 2,832,792 and 2,920,993 in which there is described suitable methods.

The bromide and chloride of Formula V can be prepared from the corresponding C-1 alcohol which is obtained by reduction of an acid or ester of the Formula IX

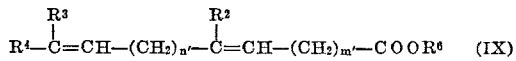

in which $R^6$ is hydrogen or lower alkyl and $m'$ is zero or one, using lithium aluminum hydride, or the like. The overall synthesis can be outlined as follows:

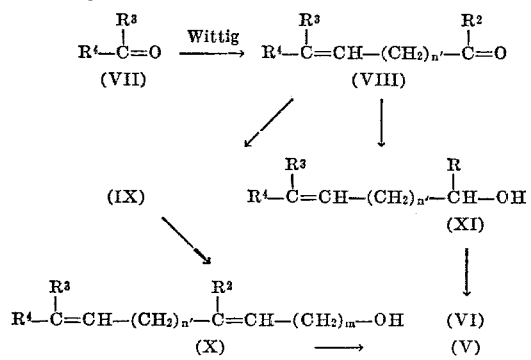

In the practice of the above process, a dialkyl ketone of Formula VII is reacted with a Wittig reagent of Formula VII′ ($\phi$ is phenyl)

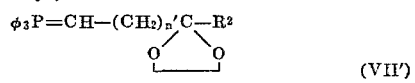

to form the ethylene ketal of a compound of Formula VIII which is hydrolyzed by treatment with acid to the ketone (VIII). The ketone (VIII) is then reacted with the carbanion of dialkyl carbalkoxyphosphonate to yield the α,β-unsaturated ester (IX) ($m'$ is zero and $R^6$ is lower alkyl) or with β-carboxyethyltriphenylphosphonium chloride in the presence of base to yield the β,γ-unsaturated acid (IX; $m'$ is one and $R^6$ is hydrogen). Suitable conditions are described in my application Ser. No. 7,987, filed Feb. 2, 1970, now U.S. 3,697,565 and by H. S. Corey et al., J. Am. Chem. Soc. 86, 1884–1885 (1964), the disclosure of which are incorporated by reference. The acid or ester (IX) is then reduced by conventional techniques using lithium aluminum hydride or like reducing agent to yield the primary alcohol (X) which is converted to the C-1 bromide or chloride (V) using phosphorus trichloride, phosphorus tribromide, phosphorus pentachloride, phosphorus pentabromide, or the like. Compounds of Formula V can be prepared also using the synthesis of Bowers, Science 164, 323–325 (1969) which are incorporated by reference. The compounds of Formula XI are prepared by reduction of the ketone (VIII) using sodium borohydride, lithium aluminum hydride, or the like, and the conversion of the secondary alcohol (XI) into the bromide or chloride (VI) using phosphorus tribromide or phosphorus trichloride.

The thio compounds of Formulas I′ and II′ (W is sulfur) can be prepared by treating a bromide or chloride of Formula V or VI with sesamolyl mercaptan in the presence of sodium hydroxide, sodium alkoxide, and the like. Alternatively, the halide V or VI is converted to the corresponding thiol by treatment with hydrogen sulfide in alcohol in the presence of base, such as sodium hydroxide. The thus-obtained aliphatic thiol on treatment with sodium hydroxide, potassium hydroxide, or the like, furnishes the corresponding alkali mercaptide which on treatment with the bromide or chloride of the Formula X–$R^1$ furnishes the thioethers or sulfides of Formulas I′ and II′ (W is sulfur).

The sulfinyl compounds are prepared by treatment of a thioether with sodium metaperiodate, hydrogen peroxide, or the like, at a temperature of from about 0° to 20° C. for about one to six hours. The reaction usually affords some of the sulfonyl compound also which can be separated by chromatography. By using more than one mole of sodium periodate or hydrogen peroxide, higher temperature and longer reaction time, the reaction favors formation of the sulfonyl compounds. Preparation of sulfinyl and sulfonyl compounds is described by N. J. Leonard et al., Journal of Organic Chemistry, 27, 282 (1962).

The amines of Formulas III′ and IV′ are prepared by the reaction of a halide of Formula V or VI with 3,4-methylenedioxyphenylamine. The reaction usually affords a mixture of secondary and tertiary amines, the tertiary amine being favored by using an excess of the halide V or VI.

An alternative process for the preparation of compounds of the Formulas I, II, III or IV is to perform the addition of water or alcohol, using the mercuric salt process described above, on a compound of Formulas V, VI or IX and thereafter perform alkylation by reaction with a salt of sesamol, sesamolyl amine or sesamolyl mercaptan.

The following examples are provided to illustrate the practice of the present invention and the preparation of the novel compounds. Temperature in degrees centigrade.

EXAMPLE 1

(A) 3,7-diethylnona-2,6-dien-1-ol (4.8 g.) is dissolved in 40 ml. of ether, cooled to −50° and 2.44 g. of phosphorus tribromide in 5 ml. of ether is added over 20 minutes. The reaction mixture is stirred for two hours, poured onto ice and extracted with ether. The ethereal extracts are combined, washed with 10% sodium carbonate, water and saturated sodium chloride, dried over sodium sulfate and the solvent concentrated to yield 1-bromo-3,7-diethylnona-2,6-diene.

(B) To a suspension of 1 g. of sodium hydride (washed with pentane) in 10 ml. of tetrahydrofuran, under argon, and cooled to 4° is added 3.38 g. of sesamol in 15 ml. of tetrahydrofuran over one hour. The reaction mixture is stirred for about 16 hours.

To the above-prepared sodium salt solution of sesamol, cooled in an ice-bath, is added with ether concentrate of the allylic bromide from part A over 1.5 hours. After 1.75 hours, the reaction is warmed to room temperature and allowed to stand about 16 hours. The reaction is poured into water and extracted with ether. The ethereal extracts are combined, washed with 10% NaOH, water and saturated sodium chloride, dried over sodium sulfate and solvents evaporated to yield 1-(3',7'-diethylnona-2',6'-dienyloxy)-3,4-methylenedioxybenzene.

(C) The procedure of part A is repeated with the exception of using an equal amount of the C-1 alcohols listed in column I to afford the corresponding C-1 bromide listed in column II.

I 3,7-dimethylocta-2,6-dien-1-ol,
3-methyl-7-ethylnona-2,6-dien-1-ol,
3,7-dimethylnona-2,6-dien-1-ol,
4-methyl-8-ethyldeca-3,7-dien-1-ol,
4,8-dimethyldeca-3,7-dien-1-ol,
4,8-dimethylnona-3,7-dien-1-ol,
1,5-dimethylhex-4-en-1-ol,
3,7-dimethyloct-6-en-1-ol,

II 1-bromo-3,7-dimethylocta-2,6-diene,
1-bromo-3-methyl-7-ethylnona-2,6-diene,
1-bromo-3,7-dimethylnona-2,6-diene,
1-bromo-4-methyl-8-ethyldeca-3,7-diene,
1-bromo-4,8-dimethyldeca-3,7-diene,
1-bromo-4,8-dimethylnona-3,7-diene,
1-bromo-1,5-dimethylhex-4-ene,
1-bromo-3,7-dimethyloct-6-ene The C-1 chlorides are prepared in the same way using phosphorus trichloride in place of phosphorus tribromide.

(D) By repeating the process of part B using the bromides listed in column II as the starting material, the corresponding sesamolyl ethers listed in column III are obtained.

III 1-(3',7'-dimethylocta-2',6',-dienyloxy)-3,4-methylenedioxybenzene,
1-(3'-methyl-7'-ethylnona-2',6'-dienyloxy)-3,4-methylenedioxybenzene,
1-(3',7'-dimethylnona-2',6'-dienyloxy)-3,4-methylenedioxybenzene,
L-(4'-methyl-8'-ethyldeca-3',7'-dienyloxy)-3,4-methylenedioxybenzene,
1-(4',8'-dimethyldeca-3',7'-dienyloxy)-3,4-methylenedioxybenzene,
1-(4',8'-dimethylnona-3',7'-dienyloxy)-3,4-methylenedioxybenzene,
1-(1',5'-dimethylhex-4'-enyloxy)-3,4-methylenedioxybenzene, and
1-(3',7'-dimethyloct-6'-enyloxy)-3,4-methylenedioxybenzene.

EXAMPLE 2

(A) To a solution of 2 g. of 1-(3',7'-dimethylocta-2',6'-dienyloxy)-3,4-methylenedioxybenzene in 20 ml. of ethanol, cooled to 0° by an ice bath, is added a suspension of 2.32 g. of mercuric acetate in 50 ml. of ethanol over 15 minutes. The reaction mixture is stirred for two hours and then, with cooling, 1.22 g. of potassium hydroxide in 20 ml. of ethanol is added. Then 0.139 g. of sodium borohydride is added in small portions and stirring continued 30 minutes. The solution is decanted, then concentrated to half volume, diluted with 100 ml. of water and extracted with ether (3× 50). The ethereal phase is washed with water, dried over magnesium sulfate, and the crude product chromatographed on silica using hexane: ether to yield 1-(3',7'-dimethyl-7'-ethoxyoct-2'-enyloxy)-3,4-methylenedioxybenzene (I; W is oxygen, each of $R^2$, $R^3$ and $R^4$ is methyl, $R^5$ is —OR in which R is ethyl, $m$ is one and Z taken with Z' is a carbon-carbon double bond).

(B) The foregoing process of part A is repeated with the exception of replacing 1-(3',7'-dimethylocta-2',6'-dienyloxy) - 3,4 - methylenedioxybenzene with an equal amount of each of:

1-(3',7'-diethylnona-2',6'-dienyloxy)-3,4-methylenedioxybenzene,
1-(3'-methyl-7'-ethylnona-2',6'-dienyloxy)-3,4-methylenedioxybenzene,
1-(3',7'-dimethylnona-2',6'-dienyloxy)-3,4-methylenedioxybenzene,
1-(4'-methyl-8'-ethyldeca-3',7'-dienyloxy)-3,4-methylenedioxybenzene,
1-(4',8'-dimethyldeca-3',7'-dienyloxy)-3,4-methylenedioxybenzene,
1-(4',8'-dimethylnona-3',7'-dienyloxy)-3,4-methylenedioxybenzene,
1-(1',5'-dimethylhex-4'-enyloxy)-3,4-methylenedioxybenzene,
1-(3',7'-dimethyloct-6'-enyloxy)-3,4-methylene dioxybenzene, to yield 1-(3',7'-diethyl-7'-ethoxynon-2'-enyloxy)-3,4-methylenedioxybenzene,
1-(3'-methyl-7'-ethyl-7'-ethoxynon-2'-enyloxy)-3,4-methyenedioxybenzene,
1-(3',7'-dimethyl-7'-ethoxynon-2'-enyloxy)-3,4-methylenedioxybenzene,
1-(4'-methyl-8'-ethyl-8'-ethoxydec-3'-enyloxy)-3,4-methylenedioxybenzene,
1-(4',8'-dimethyl-8'-ethoxydec-3'-enyloxy)-3,4-methylenedioxybenzene,
1-(4',8'-dimethyl-8'-ethoxynon-3'-enyloxy)-3,4-methylenedioxybenzene,
1-(1',5'-dimethyl-5'-ethoxyhexanyloxy)-3,4-methylenedioxybenzene, and
1-(3',7'-dimethyl-7'-ethoxyoctanyloxy)-3,4-methylenedioxybenzene.

By use of each of methanol, n-propanol, i-propanol or n-butanol in the foregoing process of this example in place of ethanol, the corresponding alcohol additives are obtained. For example, the use of an equal amount of methanol, n-propanol, i-propanol or n-butanol in place of ethanol in part A yields each of 1-(3',7'-dimethyl-7'-methoct-2'-enyloxy) - 3,4 - methylenedioxybenzene, 1-[3',7'-dimethyl-7'-(n-propoxy) - oct - 2'-enyloxy]-3,4-methylenedioxybenzene, 1-[3',7'-dimethyl - 7' - (i-propoxy)-oct-2' - enyloxy]-3,4-methylenedioxybenzene and 1,[3',7'-dimethyl-7'-(n-butoxy) - oct - 2' - enyloxy]-3,4-methylene dioxybenzene, respectively.

EXAMPLE 3

To a mixture of 1.9 g. of mercuric acetate, 6 ml. of water and 20 ml. of tetrahydrofuran is added 1.49 g. of 1-(3',7'-diethylnona-2',6'-dienyloxy) - 3,4 - methylenedioxybenzene slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica to yield 1-(7'-hydroxy-3′,7′-diethylnon-2′-enyloxy) - 3,4 - methylenedioxybenzene.

The above process is repeated with the exception of using the ethers listed in column III as the starting material to yield the corresponding hydroxy substituted ether, that is:

1-(7′-hydroxy-3′,7′-dimethyloct-2′-enyloxy)-3,4-methylenedioxybenzene,
1-(7′-hydroxy-3′-methyl-7′-ethylnon-2′-enyloxy)-3,4-methylenedioxybenzene,
1-(7′-hydroxy-3′,7′-dimethylnon-2′-enyloxy)-3,4-methylenedioxybenzene,
1-(8′-hydroxy-4′-methyl-8′-ethyldec-3′-enyloxy)-3,4-methylenedioxybenzene,
1-(8′-hydroxy-4′,8′-dimethyldec-3′-enyloxy)-3,4-methylenedioxybenzene,
1-(8′-hydroxy-4′,8′-dimethylnon-3′-enyloxy)-3,4-methylenedioxybenzene,
1-(5′-hydroxy-1′,5′-dimethylhexanyloxy)-3,4-methylenedioxybenzene and
1-(7′-hydroxy-3′,7′-dimethyloctanyloxy)-3,4-methylenedioxybenzene.

EXAMPLE 4

To a solution of 2 g. of sodium in 50 ml. of methanol at about 0° is added 35 g. of 3,4-methylenedioxyphenylmercaptan. After about 0.5 hour, 15 g. of 1-bromo-3,7-dimethylocta-2,6-diene is added and then the mixture is refluxed for about two hours. Then the solvent is evaporated and the concentrate taken up in petroleum ether which is washed with water, dried over magnesium sulfate and evaporated under reduced pressure to yield 1-(3′,4′-methylenedioxyphenyl)thio - 3,7 - dimethylocta-2,6-diene which can be purified by chromatography.

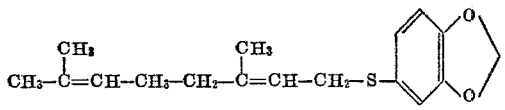

By using the other bromides listed in column II as the starting material, the corresponding thioethers are prepared.

An alternative process for the preparation of the thioethers is to prepare the thiol of the C–1 bromides listed in column II as follows:

To a solution of 2 g. of sodium hydroxide in 40 ml. of methanol saturated with hydrogen sulfide is added 14 g. of 1-bromo-3,7-dimethylocta-2,6-diene. The mixture is stirred at about 25° for about five hours with continued introduction of hydrogen sulfide. The mixture is diluted with water and then extracted with petroleum ether. The organic phase is washed well with water, dried over sodium sulfate and evaporated under reduced pressure to yield 3,7-dimethylocta-2,6-dienyl mercaptan which is purified by chromatography.

The thus-obtained thiol is then reacted with 1-bromo-3,4-methylenedioxybenzene in the presence of base as above.

EXAMPLE 5

To a solution of 2 g. of 1-(3′,4′-methylenedioxyphenyl)thio-3,7-dimethylocta-2,6-diene in 20 ml. of ethanol, cooled to 0°, is added a suspension of 2.3 g. of mercuric acetate in 50 ml. of ethanol over 15 minutes. The reaction mixture is stirred for two hours and then, with cooling, 1.2 g. of potassium hydroxide in 20 ml. of ethanol is added. Then 0.14 g. of sodium borohydride is added in small portions and stirring continued for about 30 minutes. The solution is then decanted, concentrated to half volume, diluted with 100 ml. of water and extracted with ether. The ethereal phase is washed with water, dried over magnesium sulfate and evaporated under reduced pressure to yield 1-(3′,4′-methylenedioxyphenyl)thio-7-ethoxy-3,7-dimethyloct-2-ene which is purified by chromatography.

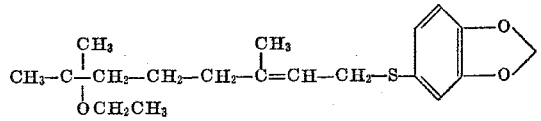

The foregoing process is used for the addition of alcohol to the other thioethers prepared as described in Example 4 to obtain the corresponding alkoxy thioethers. Similarly, the addition of water to the thioethers is accomplished using the process of Example 3 to prepare the hydroxy substituted thioethers of the present invention.

EXAMPLE 6

To 210 ml. of a 0.5 M solution of sodium metaperiodate (aqueous methanol 1/1 at 0° is added 0.1 mole of 1 - (3′,4′-methylenedioxyphenyl)thio-7-ethoxy-3,7-dimethyloct-2-ene. The mixture is stirred at 0° for four hours and then filtered to remove precipitated sodium iodate. The filtrate is diluted with water and then extracted with chloroform. The extract is dried over magnesium sulfate and solvent removed by evaporation under reduced pressure to yield 3,4-methylenedioxyphenyl 4-ethoxy-3,7-dimethyloct-2-enylsulfoxide.

Other sulfoxides of the present invention are prepared using the foregoing process.

EXAMPLE 7

To 200 ml. of aqueous methanol (1/1) containing 0.2 moles of sodium metaperiodate is added 0.1 mole of 1-(3′,4′-methylenedioxyphenyl)thio - 7 - ethoxy-3,7-dimethyloct-2-ene. The mixture is maintained at about 30° for six hours. After cooling, the mixture is filtered to remove precipitated sodium iodate. The filtrate is diluted with water and then extracted with chloroform. The extract is dried over magnesium sulfate and solvent removed by evaporation to yield 3,4-methylenedioxyphenyl-7-ethoxy-3,7-dimethyloct-2-enylsulfone which can be purified by chromatography on silica.

Using the above process, the other sulfones of the present invention are prepared.

EXAMPLE 8

(A) To a solution of 4.0 g. of 3,4-methylenedioxyaniline in 20 ml. of dimethylformamide is added 8 g. of 1-bromo-3,7-dimethylocta-2,6-diene and 5.2 g. of potassium carbonate. The mixture is heated at about 60° for 10 hours. The mixture is then diluted with water followed by extraction with ether. The ethereal phase is washed, dried over magnesium sulfate and evaporated under reduced pressure to yield crude N-3,7-dimethylocta-2,6-dienyl 3,4-methylenedioxyaniline which is purified by chromatography.

The above process is useful for preparing the corresponding amines from the bromides listed in column II. Thus, for example, 1-bromo-3,7-dimethyloct-6-ene is converted into N-3,7-dimethyloct-6-enyl 3,4-methylenedioxyaniline and 1-bromo-1,5-dimethylhex-4-ene into N-1,5-dimethylhex-4-enyl 3,4-methylenedioxyaniline.

By using a larger quantity of the C–1 bromide reagent in the above process, the formation of tertiary amine (III′ and IV′ in which p is two) is favored. Thus, in the above process, use of 16 g. of 1-bromo-3,7-dimethylocta-2,6-diene gives almost exclusively N,N-3,7-dimethylocta-2,6-dienyl 3,4-methylenedioxyaniline.

(B) To a solution of 2 g. of N-3,7-dimethylocta-2,6-dienyl 3,4-methylenedioxyaniline in 20 ml. of ethanol, cooled to about 0°, is added a suspension of 2.3 g. of mercuric acetate in 50 ml. of ethanol over about 15 minutes. The reaction mixture is stirred for about two hours and then, with cooling, 1.2 g. of ethanol is added. Then, 0.14 g. of sodium borohydride is added in small portions and stirring continued about 30 minutes. The solution is decanted, concentrated to half volume, diluted with water and then extracted with ether. The ethereal phase is washed with water and dried over magnesium sulfate to yield N-7-ethoxy-3,7-dimethyloct-2-enyl 3,4-methylenedioxyaniline which is purified by chromatography.

By use of the above method, other compounds of the present invention of Formula III are prepared from the appropriate precursor prepared as described in part A. Thus, each of N-3,7-dimethyloct-6-enyl 3,4-methylenedioxyaniline and N-1,5-dimethylhex-4-enyl 3,4-methylenedioxyaniline is converted into N-7-ethoxy-3,7-dimethyloctanyl 3,4-methylenedioxyaniline and N-5-ethoxy - 1,5 - dimethylhexanyl 3,4-methylenedioxyaniline, respectively. Similarly, other alkoxy derivatives are prepared by using other alcohols in place of ethanol. The hydroxy derivatives are prepared using the process of Example 3 with the exception of using an amine of Formulas III' and IV' as the starting material. By using double the amount of mercuric salt alcohol in the above process, the substituted tertiary amines are prepared.

EXAMPLE 9

The process of Example 2, part A, is repeated using benzyl alcohol in place of ethanol to yield 1-(3',7'-dimethyl-7'-benzyloxyoct-2'-enyloxy)-3,4 - methylenedioxybenzene.

EXAMPLE 10

(A) To a solution of 20.9 g. of the ethylene ketal of 1-bromo-4-pentanone (obtained by treating 1-bromo-4-pentanone with ethylene glycol in benzene in the presence of p-toluenesulfonic acid) in 100 ml. of benzene is added 20 g. of triphenylphosphine. The mixture is heated at reflux temperature for two hours and then filtered. The solid material thus-collected is washed with benzene, dried in vacuo and added to 6.49 g. of butyl lithium in 50 ml. of dimethylsulfoxide. The mixture is stirred until an orange solution is obtained and 38 g. of methyl ethyl ketone is then added. The mixture is stirred at about 25° for about eight hours, poured into water and then extracted with ether. The ethereal phase is concentrated and the concentrate added to 0.1 N solution of hydrochloric acid in aqueous acetone and stirred for about 15 hours. The mixture is then poured into ice water and extracted with ethyl acetate. The extracts are combined, washed with water, dried over sodium sulfate and evaporated to yield 6-methyl-5-octen-2-one (VIII; $R^2=R^3=$methyl, $R^4=$ethyl) which is purified by chromatography and separated into the cis and trans isomer.

By repeating the above process using the ethylene ketal of each of 1-bromo-5-hexanone and 1-bromo-4-hexanone, there is obtained 7-methyl-6-nonen-2-one and 7-methyl-6-nonen-3-one.

(B) A mixture of 11.2 g. of diethyl carbomethoxymethylphosphonate in 100 ml. of dimethylformamide is treated with 2.4 g. of sodium hydride. The mixture is stirred until the evolution of gas ceases and then 10 g. of 7-methyl-6-nonen-2-one is added slowly with stirring, maintaining temperature below 30°. The mixture is stirred for about one hour, then diluted with water and then extracted with ether. The ethereal phase is washed with water, dried over sodium sulfate and evaporated under reduced pressure to yield methyl 3,8-dimethyldeca-2,7-diencate as a mixture of isomers (trans, cis; trans,trans; cis, cis; and cis,trans) which are separated by chromatography.

(C) Six grams of 6-methyl-5-octen-2-one is added to a solution of 3.0 g. of sodium borohydride, 80 ml. of methanol and 6 ml. of 2 N sodium hydroxide solution. After about two hours, acetic acid is added to destroy excess sodium borohydride and the solution poured into water and extracted with ether. The combined ether extracts are washed with aqueous sodium bicarbonate, water and brine, dried and evaporated to yield 6-methyl-5-octen-2-ol which is purified by chromatography.

Similarly, 7-methyl-6-nonen - 2 - one and 7-methyl-6-nonen-3-one is reduced to 7-methyl-6-nonen-2-ol and 7-methyl-6-nonen-3-ol.

Triphenylphosphite benzoylchloride (10 g.) is mixed with 1.9 g. of 6-methyl-5-octen-2-ol and kept at room temperature overnight. The crude product is washed with 2 N sodium hydroxide and water and dried to yield 2-chloro-6-methyl-5-octene.

Alternatively, the method of Example 1 is used to prepare the bromide and chloride.

(D) A solution of 2 g. of methyl-3,8-dimethyldeca-2,7-dienoate in 20 ml. of dry ether is added with stirring to 0.4 g. of lithium aluminum hydride covered in ether at 0°. After about one hour, 2.5 ml. of acetic acid is added. The mixture is washed with ice water and the ether phase dried and evaporated to yield 3,8-dimethyldeca-2,7-dien-1-ol which is treated with phosphorus tribromide to yield 1-bromo-3,8-dimethyldeca-2,7-diene.

(E) 6-methyl-5-hepten-2-one is converted into a 4,8-dimethylnona-3,7-dienoic acid by reaction with β-carboxyethyltriphenylphosphonium chloride in dimethylsulfoxide using the method of H. S. Corey et al., J. Am. Chem. Soc. 86, 1884 (1964). The trans and cis isomer can be separated by chromatography at this point or a mixture of the two isomers employed in further reactions. The acid is then converted into the acid chloride using thionyl chloride at room temperature or slightly higher temperature. The acid chloride is then treated with an alcohol, such as methanol or ethanol, at a temperature of about 40° for a few minutes to yield the ester, e.g. methyl 4,8-dimethylnona-3,7-dienoate or ethyl 4,8-dimethylnona-3,7-dienoate.

By use of the above procedure, each of 7-methyl-6-nonen-2-one and 6-methyl-5-octen-2-one is converted into methyl 4,9-dimethylundeca-3,8-dienoate and methyl 4,8-dimethyldeca-3,7-dienoate, respectively.

Following the procedure of part D above, each of the esters is reduced to the C–1 alcohol, i.e. 4,8-dimethylnona-3,7-dien-1-ol, 4,9-dimethylundeca-3,8-dien-1-ol and 4,8-dimethyl-deca-3,7-dien-1-ol and then to the C–1 bromide, namely, 1-bromo - 4,8 - dimethylnona-3,7-diene, 1-bromo-4,9-dimethylundeca-3,8-diene and 1-bromo-4,8-dimethyldeca-3,7-diene, respectively.

EXAMPLE 11

To a solution of 1.7 g. of methyl 4,8-dimethylnona-3,7-dienoate in 20 ml. of ethanol, cooled to about 0°, is added a suspension of 2.3 g. of mercuric acetate in 50 ml. of ethanol, over about 15 minutes. The reaction mixture is stirred for two hours and then, with cooling, 1.2 g. of potassium hydroxide in 20 ml. of ethanol is added. Then 0.26 g. of sodium borohydride is added in small portions and stirring continued 30 minutes. The solution is decanted, concentrated to half volume, diluted with water and extracted with ether. The ethereal phase is washed with water, dried over magnesium sulfate and the product chromatographed to yield 8-ethoxy-4,8-dimethylnon-3-en-1-ol and methyl 8-ethoxy-4,8-dimethylnon-3-enoate.

The methyl ester, methyl 8-ethoxy-4,8-dimethylnon-3-enoate is reduced using lithium aluminum hydride following the procedure of Example 10, Part D, to the alcohol, 8-ethoxy-4,8-dimethylnon-3-en-1-ol.

Using the foregoing procedure, each of methyl 4,9-dimethylundeca-3,8-dienoate and methyl 4,8-dimethyldeca-3,7-dienoate is converted into 9-ethoxy-4,9-dimethylundec-3-en-1-ol and 8-ethoxy-4,8-dimethyldec-3-en-1-ol. Following the procedure of, for example, Example 1 (A and then B), the C–1 alcohols thus-obtained are converted into the C–1 bromide and then the methylenedioxyphenyl ether.

A suspension of 0.5 g. of 5% palladium-on-carbon catalyst in 50 ml. of benzene is hydrogenated for 30 minutes. A mixture of 1.5 g. of 9-ethoxy-4,9-dimethylundec- 3-en-1-ol- in 75 ml. of methanol is added and hydrogenated with agitation until the theoretical amount of hydrogen is absorbed. The catalyst is removed by filtration and the solution evaporated to yield 9-ethoxy-4,9-dimethylundecan-1-ol which is purified by chromatography. The product is treated with phosphorus tribromide to yield 1-bromo-9-ethoxy-4,9-dimethylundecane which can be used as the alkylating agent for preparation of compounds of the present invention of Formulas I and III.

The foregoing hydrogenation procedure can be used for preparing the saturated derivatives of the present invention (i.e. when each of Z and Z' is hydrogen) by hydrogenation of the final product or intermediates therefor.

Thirty *Aedes aegypti*, 4th instar larvae, in 50 ml. of water are treated with 1-(7'-hydroxy-3',7'-dimethyloct-2'-enyloxy) - 3,4 - methylenedioxybenzene (1 p.p.m.). Twenty-nine of the specimens died within a few days and one specimen emerged partially but was abnormal and died. Similar results are obtained from 1-(7'-ethoxy-3',7'-dimethyloct-2'-enyloxy) - 3,4 - methylenedioxybenzene.

What is claimed is:

1. A compound selected from those of the formulas:

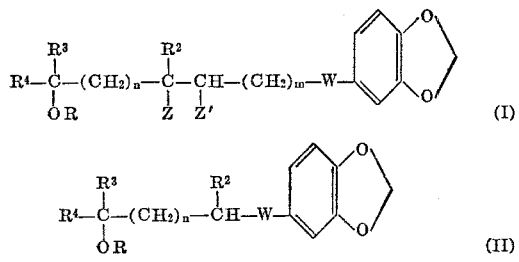

wherein:
each of $R^2, R^3$ and $R^4$ is lower alkyl;
R is hydrogen, lower alkyl or aralkyl of 7 to 12 carbon atoms;
W is oxygen or sulfur;
Z and Z', when taken separately, represent hydrogen and, when taken together, form a carbon-carbon double bond;
$m$ is one or two; and
$n$ is three or four.

2. A compound according to claim 1 of the Formula I wherein W is oxygen.

3. A compound according to claim 2 in which R is hydrogen or lower alkyl of one to three carbons.

4. A compound according to claim 3 in which $n$ is three.

5. A compound according to claim 3 in which $n$ is three and each of $R^2$, $R^3$ and $R^4$ is methyl or ethyl.

6. A compound according to claim 5 in which Z taken with Z' is a carbon-carbon double bond.

7. A compound according to claim 5 in which each of $R^2$, $R^3$ and $R^4$ is methyl; $m$ is one; and R is ethyl.

8. A compound according to claim 5 in which each of $R^3$ and $R^4$ is ethyl; $R^2$ is methyl or ethyl; and $m$ is one.

9. A compound according to claim 5 in which each of $R^2$ and $R^3$ is methyl; $R^4$ is ethyl; and $m$ is one.

10. A compound according to claim 3 in which each of $R^2$, $R^3$ and $R^4$ is methyl or ethyl; $m$ is two; and $n$ is three.

11. A compound according to claim 10 in which each of $R^2$ and $R^3$ is methyl and $R^4$ is methyl or ethyl.

12. A compound according to claim 10 in which each of $R^3$ and $R^4$ is ethyl and $R^2$ is methyl or ethyl.

13. A compound according to claim 11 in which R is ethyl.

14. A compound according to claim 12 in which R is ethyl.

15. A compound according to claim 10 in which R is ethyl.

16. A compound according to claim 5 in which each of Z and Z' is hydrogen.

17. A compound according to claim 16 in which R is ethyl.

18. The compound, 1-[3'-methyl-7'-ethyl-7'-ethoxynon-2'(trans)-enyloxy]-3,4-methylenedioxybenzene, according to claim 2.

19. The compound, 1-[3',7'-dimethyl-7'-ethoxyoct-2'-(trans) - enyloxy]-3,4-methylenedioxybenzene, according to claim 2.

20. The compound, 1-[3',7'-dimethyl-7'-ethoxynon-2'-(trans) - enyloxy]-3,4-methylenedioxybenzene, according to claim 2.

21. The compound, 1-(3',7'-dimethyl - 7' - ethoxyoctanyloxy) - 3,4 - methylenedioxybenzene, according to claim 2.

22. A compound according to claim 1 of Formula II wherein W is oxygen.

23. A compound according to claim 22 in which $n$ is three; each of $R^2$, $R^3$ and $R^4$ is methyl or ethyl; and R is hydrogen or lower alkyl of one to three carbons.

24. A compound according to claim 23 in which each of $R^2$, $R^3$ and $R^4$ is methyl and R is ethyl.

25. A compound of Formula I or II of claim 1 in which W is sulfur.

26. A compound according to claim 25 in which $n$ is three and each of $R^2$, $R^3$ and $R^4$ is methyl or ethyl.

27. A compound according to claim 26 in which R is lower alkyl of one to three carbons.

References Cited

UNITED STATES PATENTS 3,395,143  7/1968  Thiele et al. _____ 260—340.5
3,563,982  2/1971  Bowers _____ 260—340.5

OTHER REFERENCES

Moore et al., "Journal of the Science of Food and Agriculture," vol. 9 (10), 1958, pp. 666–672.

Beroza, "Agriculture and Food Chemistry," vol. 4 (1), 1956, pp. 49–53.

ALEX MAZEL, Primary Examiner

J. H. TURNIPSEED, Assistant Examiner

U.S. Cl. X.R.

424—282